United States Patent
Hirono et al.

(10) Patent No.: US 10,525,658 B2
(45) Date of Patent: Jan. 7, 2020

(54) METHOD FOR PRODUCING MESH, AND MESH

(71) Applicants: OMRON Corporation, Kyoto-shi, Kyoto (JP); OMRON Healthcare Co., Ltd., Muko-shi, Kyoto (JP)

(72) Inventors: Satoshi Hirono, Kusatsu (JP); Yuka Tanioka, Otsu (JP); Junji Kawamoto, Kyoto (JP); Makoto Tabata, Kyoto (JP); Akio Sumiya, Kusatsu (JP)

(73) Assignees: OMRON Corporation, Kyoto-shi (JP); OMRON HEALTHCARE Co., Ltd., Muko-shi (JP)

( * ) Notice: Subject to any disclaimer, the term of this patent is extended or adjusted under 35 U.S.C. 154(b) by 158 days.

(21) Appl. No.: 15/532,488

(22) PCT Filed: Nov. 18, 2015

(86) PCT No.: PCT/JP2015/082376
§ 371 (c)(1),
(2) Date: Jun. 1, 2017

(87) PCT Pub. No.: WO2016/088555
PCT Pub. Date: Jun. 9, 2016

(65) Prior Publication Data
US 2018/0264773 A1  Sep. 20, 2018

(30) Foreign Application Priority Data

Dec. 5, 2014 (JP) .................... 2014-247338

(51) Int. Cl.
*B32B 3/26* (2006.01)
*B29C 65/16* (2006.01)
(Continued)

(52) U.S. Cl.
CPC .............. *B32B 3/266* (2013.01); *B29C 65/16* (2013.01); *B29C 66/71* (2013.01); *B29C 67/00* (2013.01);
(Continued)

(58) Field of Classification Search
CPC ...................................... B32B 3/266
(Continued)

(56) References Cited

U.S. PATENT DOCUMENTS

2015/0037525 A1  2/2015 Maeda et al.

FOREIGN PATENT DOCUMENTS

JP  2004-306137 A   11/2004
JP  2013-169748 A   9/2013
(Continued)

OTHER PUBLICATIONS

International Search Report (ISR) dated Feb. 9, 2016 for PCT Application No. PCT/JP2015/082376.
(Continued)

*Primary Examiner* — Brent T O'Hern
(74) *Attorney, Agent, or Firm* — Metrolex IP Law Group, PLLC

(57) ABSTRACT

A method for producing a mesh including a resin mesh main body, and a resin reinforcing member configured to reinforce the mesh main body includes: a step of forming a plurality of through-holes using a laser beam in a mesh formation region of a first film material made of resin; a step of forming an opening portion in a second film material made of resin; a step of layering the first film material and the second film material so that the mesh formation region and the opening portion are arranged at positions that conform to each other; and a step of joining the first film material and the second film material to each other through laser welding at a portion surrounding the opening portion.

2 Claims, 14 Drawing Sheets

(51) Int. Cl.
  *B29C 67/00* (2017.01)
  *B29C 65/00* (2006.01)
  *B32B 27/08* (2006.01)
  *B32B 27/36* (2006.01)
  *B23K 26/38* (2014.01)

(52) U.S. Cl.
  CPC ............ *B32B 27/08* (2013.01); *B32B 27/365* (2013.01); *B23K 26/38* (2013.01); *B32B 2307/4026* (2013.01)

(58) Field of Classification Search
  USPC ........................................................ 428/137
  See application file for complete search history.

(56) References Cited

FOREIGN PATENT DOCUMENTS

| | | | | |
|---|---|---|---|---|
| JP | 2013-203047 A | 10/2013 | | |
| JP | 2013-203056 A | 10/2013 | | |
| JP | 2014-004208 A | 1/2014 | | |
| JP | 2014004208 A | * 1/2014 | ......... | B05B 17/0623 |
| WO | 2011/148492 A1 | 12/2011 | | |

OTHER PUBLICATIONS

The Office Action dated Aug. 3, 2018 in the counterpart Chinese patent application No. 201580065307.2.

* cited by examiner

METHOD FOR PRODUCING MESH, AND MESH

TECHNICAL FIELD

The present invention relates to a method for producing a mesh, and a mesh.

RELATED ART

Conventionally, a mesh is known in which a large number of very small through-holes are formed (see Patent Document 1, for example).

Patent Document 1 discloses a mesh portion provided in a liquid spray apparatus. The mesh portion is made of resin, and has a thin plate-like outer shape in which a plurality of through-holes are formed. This mesh portion is provided in order to nebulize a medical fluid. The circumferential edge of this mesh portion is joined to a doughnut-like reinforcing portion having a hollow portion. Thus, the resin mesh portion whose thickness is small and has low rigidity is reinforced by the reinforcing portion, and thus sufficient strength is achieved as a whole. The mesh portion is formed by using, for example, a mold.

RELATED ART DOCUMENT

Patent Document

Patent Document 1: JP 2014-4208A

SUMMARY OF THE INVENTION

Problem to be Solved by the Invention

However, in the case where a mesh portion is formed by using a mold as described above, it is necessary to change the mold that is to be used, in order to change the opening diameter, the number, or the like of through-holes. That is to say, it is difficult to change the design of the mesh portion.

The present invention was made in order to solve the above problems, and it is an object thereof to provide a method for producing a mesh, and a mesh, in which the design can be easily changed.

Means for Solving the Problems

The present invention is directed to a method for producing a mesh including a resin mesh main body, and a resin reinforcing member configured to reinforce the mesh main body, the method including: a step of forming a plurality of through-holes using a laser beam in a mesh formation region of a first film material made of resin; a step of forming an opening portion in a second film material made of resin; a step of layering the first film material and the second film material so that the mesh formation region and the opening portion are arranged at positions that conform to each other; and a step of joining the first film material and the second film material to each other through laser welding at a portion surrounding the opening portion.

The through-holes of the mesh formation region are formed using an ultraviolet laser beam in this manner, and thus the design of the through-holes of the mesh formation region can be easily changed by changing the laser irradiation conditions or the like. Accordingly, a mesh having different opening diameters, numbers, or the like of through-holes can be produced at a cost lower than that in the case where a mold or the like is used. Thus, a mesh that corresponds to a medical fluid can be easily provided. Furthermore, since the first film material and the second film material are joined to each other through laser welding, the heat-affected zone can be narrowed, and thus unevenness in the spray performance of the mesh can be suppressed.

The method for producing a mesh may further include: a step of cutting out an outer circumference of a joined portion of the first film material and the second film material.

In this case, the method for producing a mesh may be such that a plurality of the mesh formation regions are provided in the first film material, a plurality of the opening portions are formed in the second film material, and the plurality of mesh formation regions and the plurality of opening portions are arranged at positions that conform to each other, and portions surrounding the plurality of opening portions are joined through laser welding, after which portions surrounding the plurality of joined portions are cut out.

The method for producing a mesh may be such that, after the through-holes are formed through the first film material, the first film material and the second film material are joined to each other.

The method for producing a mesh may further include: a step of measuring a thickness of the first film material, wherein a laser irradiation condition when forming the through-holes is set according to the thickness of the first film material.

Furthermore, the present invention is directed to a method for producing a mesh including a resin mesh main body, and a resin reinforcing member configured to reinforce the mesh main body, the method including: a step of placing a second film material made of resin having an opening portion on a first film material made of resin; a step of forming a plurality of through-holes using a laser beam in a mesh formation region of the first film material; and a step of joining the first film material and the second film material to each other through laser welding at a portion surrounding the opening portion.

Furthermore, the present invention is directed to a mesh including: a resin mesh main body; and a resin reinforcing member configured to reinforce the mesh main body, wherein a mesh formation region is provided in the mesh main body, and a plurality of through-holes are formed using a laser beam in the mesh formation region, the reinforcing member is formed in the shape of a ring so as to surround the mesh formation region, and the mesh main body and the reinforcing member are joined to each other through laser welding.

The mesh may be such that each of the through-holes is formed such that an opening diameter on one end side thereof is larger than an opening diameter on another end side, and is configured such that the diameter gradually decreases from the one end side toward the other end side.

The mesh may be such that each of the through-holes is formed such that an opening diameter on one end side thereof is larger than an opening diameter on another end side, and has a cylindrical portion, and a diameter-decreasing portion whose diameter gradually decreases from the cylindrical portion toward the other end side.

The mesh may be such that each of the through-holes is formed such that an opening diameter on one end side thereof is larger than an opening diameter on another end side, and has a plurality of cylindrical portions having different opening diameters.

Effects of the Invention

According to the method for producing a mesh, and the mesh of the present invention, the design can be easily changed.

EMBODIMENTS OF THE INVENTION

Hereinafter, an embodiment of the present invention will be described with reference to the drawings.

Structure of Mesh

First, the structure of a mesh 100 according to an embodiment of the present invention will be described with reference to FIGS. 1 to 3. The mesh 100 is provided in, for example, a nebulizer (inhaler) in order to nebulize a medical fluid.

Figure 1:
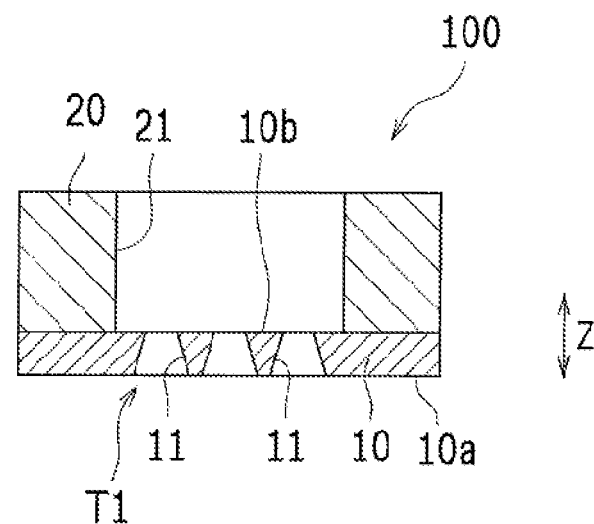
FIG. 1 is a cross-sectional view schematically showing a mesh according to an embodiment of the present invention.
Figure 2:
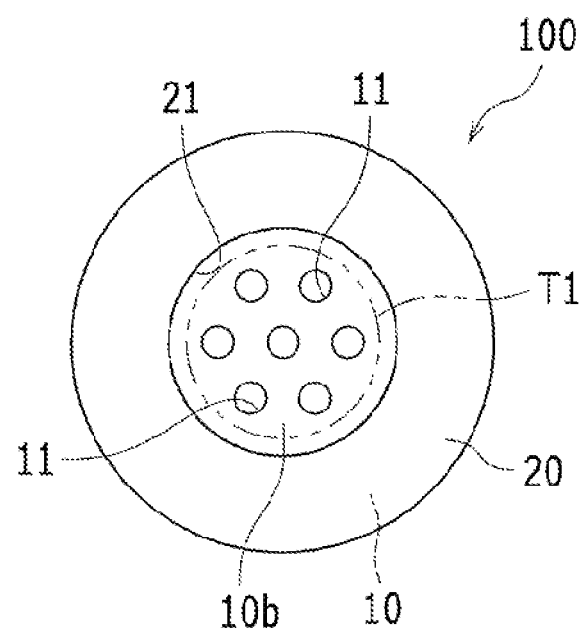
FIG. 2 is a plan view schematically showing the mesh in FIG. 1.

As shown in FIGS. 1 and 2, the mesh 100 includes a mesh main body 10, and a reinforcing member 20 configured to reinforce the mesh main body 10. In a plan view, the mesh 100 is formed in a circular shape having a diameter of, for example, 6 mm. Note that FIGS. 1 and 2 are schematic views illustrating the mesh 100, and the number, the dimensional relationship, and the like of through-holes 11 may be different from those in the actual state.

The mesh main body 10 is a thin film-like member made of resin, and is formed in a circular shape in a plan view. The mesh main body 10 is made of, for example, transparent polycarbonate, and has a thickness of 30 μm and a diameter of 6 mm. Thus, the mesh main body 10 is configured to allow transmission of a laser beam for joining therethrough.

Furthermore, a mesh formation region T1 is provided at the center of the mesh main body 10, and a large number of very small through-holes 11 are formed in the mesh formation region T1. In a plan view, the mesh formation region T1 is a circular region having a diameter of, for example, 2.5 mm. Approximately 2000 through-holes 11 are formed in the mesh formation region T1, for example, using an ultraviolet laser beam.

Figure 3:
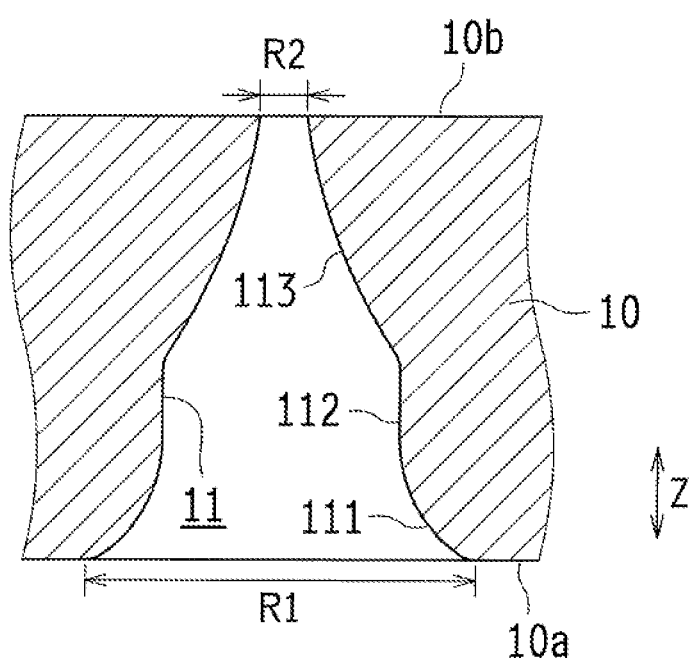
FIG. 3 is an enlarged cross-sectional view showing a through-hole of the mesh in FIG. 1.

As shown in FIG. 3, each through-hole 11 is formed such that an opening diameter R1 on one of the end sides thereof is larger than an opening diameter R2 on the other end side. That is to say, the opening diameter R1 of the inlet opening on a lower face 10a side is larger than the opening diameter R2 of the outlet opening on an upper face 10b side. If the mesh 100 is attached to a nebulizer, a medical fluid flows into the inlet openings, and a nebulized medical fluid is sprayed from the outlet openings. For example, the opening diameter R1 is approximately 25 μm, and the opening diameter R2 is approximately 3 μm.

Furthermore, the through-hole 11 includes a diameter-decreasing portion 111 formed on the lower face 10a side, a cylindrical portion 112 formed so as to be continuous from the diameter-decreasing portion 111, and a diameter-decreasing portion 113 formed so as to be continuous from the cylindrical portion 112.

The diameter-decreasing portion 111 is formed such that the diameter decreases from the lower face 10a side toward the upper face 10b side. The diameter-decreasing portion 111 has a cross-sectional shape in which curved lines bulge inward, so that the degree of diameter decrease is smaller on the upper face 10b side than on the lower face 10a side.

The cylindrical portion 112 has an opening diameter that is substantially the same throughout the thickness direction (the Z direction). The cylindrical portion 112 is disposed between the diameter-decreasing portions 111 and 113.

The diameter-decreasing portion 113 is disposed on the upper face 10b side, and is formed such that the diameter decreases from the lower face 10a side toward the upper face 10b side. The diameter-decreasing portion 113 has a cross-sectional shape in which curved lines bulge inward, so that the degree of diameter decrease is smaller on the upper face 10b side than on the lower face 10a side.

Accordingly, the through-hole 11 is configured such that the diameter decreases in the two diameter-decreasing portions 111 and 113 between which the cylindrical portion 112 is interposed, and thus the diameter decreases in two steps.

The reinforcing member 20 is a film-like member made of resin, and is formed in a circular shape in a plan view as shown in FIGS. 1 and 2. The reinforcing member 20 has a diameter (an outer diameter) of, for example, 6 mm. The reinforcing member 20 is, for example, made of black polycarbonate, and has a thickness (e.g., 410 µm) that is larger than that of the mesh main body 10. The reinforcing member 20 is configured to absorb a laser beam for joining.

Furthermore, the reinforcing member 20 is formed in the shape of a ring inside which an opening portion 21 is disposed. In a plan view, the opening portion 21 is formed in a circular shape having an opening diameter of, for example, 2.7 mm. The opening portion 21 and the mesh formation region T1 are arranged at positions that conform to each other, and the mesh formation region T1 is surrounded by the ring-like reinforcing member 20. Thus, when a medical fluid is sprayed from the through-holes 11 of the mesh formation region T1, the medical fluid passes through the opening portion 21 of the reinforcing member 20.

The mesh main body 10 and the reinforcing member 20 are joined to each other through laser welding. Specifically, in a state where the ring-like reinforcing member 20 is placed on the outer circumference of the mesh main body 10, their contact interfaces are joined to each other by welding. If the resin mesh main body 10 whose thickness is small and has low rigidity is reinforced by the reinforcing member 20 in this manner, sufficient strength of the mesh 100 is achieved as a whole.

Method for Producing Mesh

Next, a method for producing the mesh 100 according to this embodiment will be described with reference to FIGS. 1 to 17. Below, the processing procedure on each of a first film material 50 and a second film material 60 will be described, after which the processing procedure on both the first film material 50 and the second film material 60 will be described.

Processing Procedure on First Film Material

Figure 4:
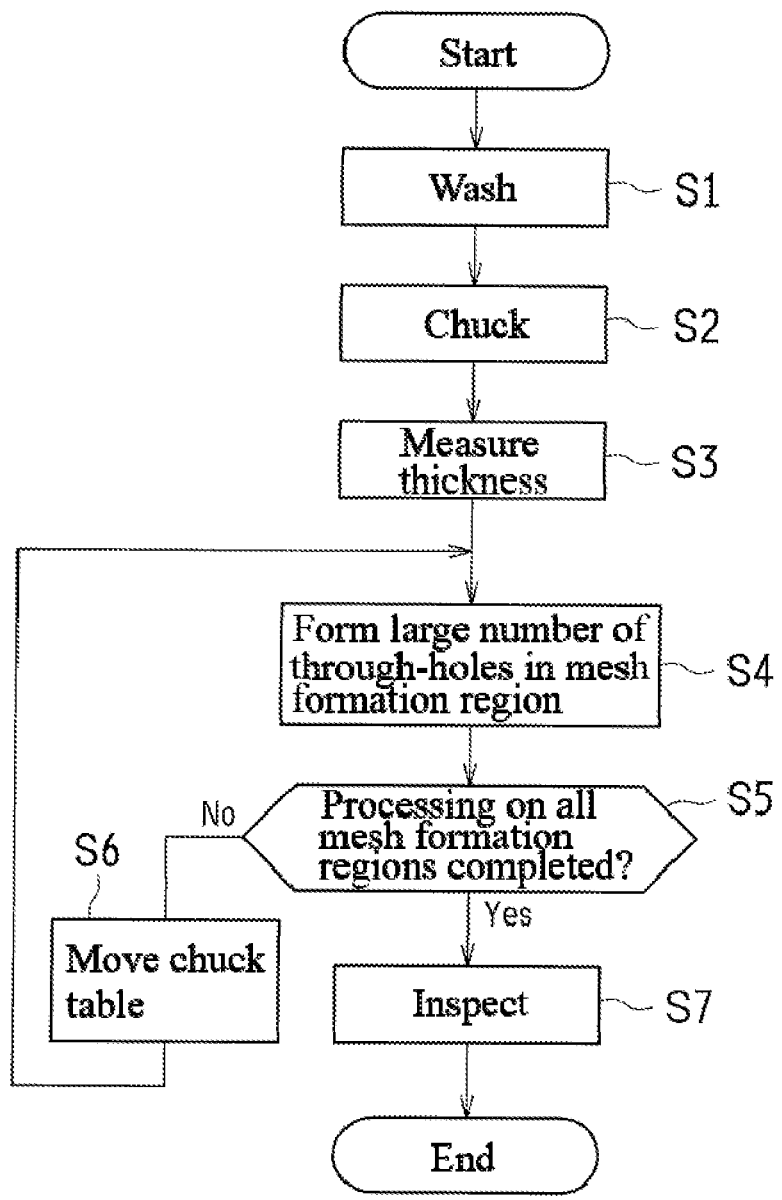
FIG. 4 is a flowchart illustrating the processing procedure on a first film material, in the method for producing a mesh of this embodiment.

First, in step S1 of FIG. 4, the first film material 50 is washed. The first film material 50 is made of, for example, transparent polycarbonate, and has a thickness of 30 µm. There is no particular limitation on the size of the first film material 50, but it is, for example, A5 or A6 for easy handling. In this washing step, the first film material 50 is subjected to ultrasonic washing with IPA (isopropyl alcohol) or the like for approximately several tens of seconds to several minutes. Subsequently, IPA is blown off the first film material 50 using an air gun or the like.

Figure 5:
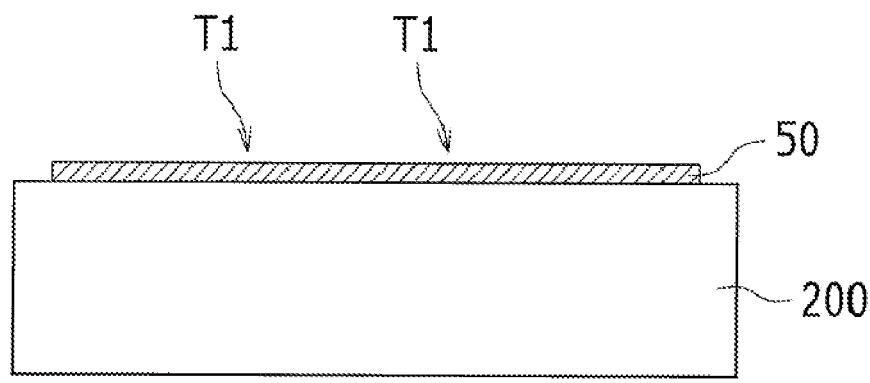
FIG. 5 is a cross-sectional view schematically showing a state in which the first film material is chucked.

Next, in step S2, the first film material 50 is placed on a chuck table 200 as shown in FIG. 5. Then, the first film material 50 is fixed to the chuck table 200 using a vacuum chuck. It is preferable that a porous ceramic chuck is used as the chuck table 200, so that the entire face of the first film material 50 is chucked. The reason for this is that, if the entire face of the first film material 50 is sucked, even when air leaks through the through-holes 11 during formation of the through-holes 11 described later, upward movement of the first film material 50 is suppressed. Accordingly, positional deviation of the first film material 50 that is to be processed is suppressed, and thus unevenness in the shape of the through-holes 11 formed is suppressed. Note that the chuck table 200 is provided on an XY stage.

Figure 6:
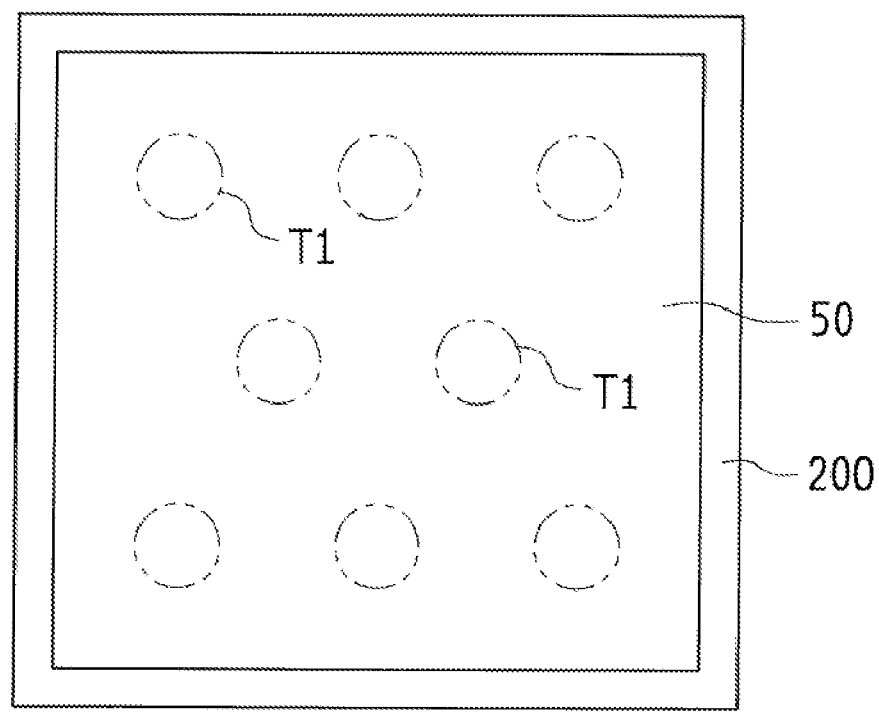
FIG. 6 is a plan view schematically showing a state in which the first film material is chucked.

Next, in step S3, the thickness of the mesh formation region T1 of the first film material 50 is measured. The mesh formation region T1 is a circular region (e.g., having a diameter of 2.5 mm) set in advance on a face of the first film material 50. Specifically, a plurality of such mesh formation regions T1 (e.g., 320 mesh formation regions T1) are provided in the first film material 50, and are arranged in a zigzag pattern as shown in FIG. 6. Note that FIG. 6 is a schematic view, and the number, the dimensional relationship, and the like may be different from those in the actual state. This applies to the drawings that will be described later. Examples of the measuring apparatuses for measuring the thickness include a stylus profilometer, an optical thickness meter, and the like. The thickness may be measured using a micrometer or the like before the first film material 50 is chucked.

The thickness of the first film material 50 is uneven between films, and is uneven in one film as well. For example, there is unevenness in the thickness by approximately 5 to 6 µm at maximum. Thus, if ultraviolet light laser irradiation conditions described later are set according to the measured thickness, unevenness in the shape (outlet opening diameter) of the through-holes 11 is suppressed.

As to a specific example, the number of shots set in advance as a reference is modified according to the measured thickness. That is to say, if the measured thickness is larger than the reference thickness, the number of shots is increased from the reference value, and, if the measured thickness is smaller than the reference thickness, the number of shots is decreased from the reference value. Note that parameters (e.g., power) other than the number of shots may be changed.

Next, in step S4, a large number of through-holes 11 are formed in a predetermined mesh formation region T1 using an ultraviolet laser beam. For example, 2000 through-holes 11 are formed in a zigzag pattern at a spacing of 30 µm in a predetermined mesh formation region T1.

In this embodiment, the processing is performed in a configuration in which a YAG fourth harmonic (wavelength 266 nm, pulse width 10 to 15 ns, repetition frequency 10 kHz) is used as an ultraviolet laser beam, a single laser beam is scanned in the X direction and the Y direction using a galvano mirror, and the beam is converged using a telecentric fθ lens. A lens having a high NA (numberical aperture) (e.g., 0.18) is used as the lens. Furthermore, as described above, the ultraviolet light laser irradiation conditions are modified according to the thickness of a predetermined mesh formation region T1.

In this embodiment, in order to form a through-hole 11, ultraviolet laser irradiation is performed in a defocused state, and ultraviolet laser irradiation is performed in a just focused state. That is to say, one through-hole 11 is formed by performing ultraviolet laser irradiation in two steps. Since a telecentric fθ lens is used, an ultraviolet laser beam is converged perpendicular to the first film material 50 in scanning, and thus, even when the focus position is changed, ultraviolet laser irradiation can be performed at the same position.

Specifically, first, the XY stage on which the chuck table 200 is provided is moved in the Z direction such that the surface of the first film material 50 conforms to the just focus position. Subsequently, the XY stage is moved in the Z direction by a predetermined defocusing amount. The defocusing amount is, for example, 0.06 mm. Then, laser irradiation in the first step is performed at a power of, for example, 50 mW. That is to say, the processing in the first step is performed in a defocused state for a number of times that corresponds to the number of holes (2000 holes) to be formed.

Subsequently, the XY stage is moved in the Z direction such that the surface of the first film material 50 conforms to the just focus position. Then, laser irradiation in the second step is performed at a power of, for example, 10 mW. That is to say, the processing in the second step is performed in a just focused state for a number of times that corresponds to the number of holes (2000 holes) to be formed. Accordingly, a large number of through-holes 11 having the shape as shown in FIG. 3 are formed in the mesh formation region T1. Note that the opening diameter R1 of the inlet opening is approximately 25 µm, and the opening diameter R2 of the outlet opening is approximately 3 µm.

Figure 7:
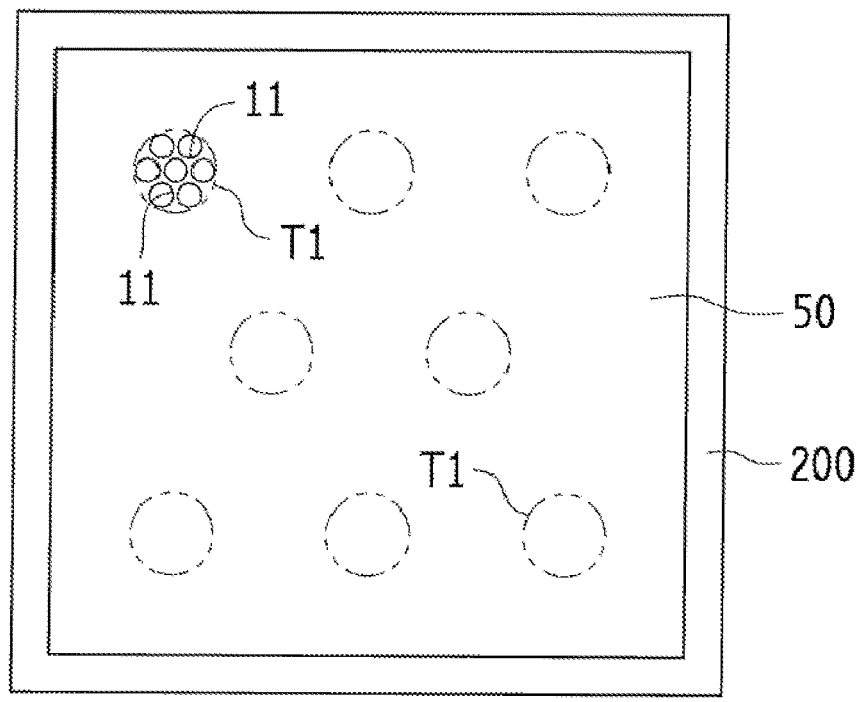
FIG. 7 is a plan view schematically showing a state in which through-holes are formed in one mesh formation region of the first film material.

In this manner, a large number of through-holes 11 are formed in one mesh formation region T1 as shown in FIG. 7. Each time the processing has been completed for one mesh formation region T1, it is determined in step S5 whether or not the processing has been completed for all mesh formation regions T1. If the processing is not completed for all mesh formation regions T1, the procedure advances to step S6.

In step S6, the first film material 50 is moved with the XY stage in a horizontal direction, for example, by approximately 7 mm, so that a mesh formation region T1 that has not been processed is located at the processing region, after which the procedure returns to step S4. Accordingly, a large number of through-holes 11 are formed in each of the mesh formation regions T1 of the first film material 50.

Figure 8:
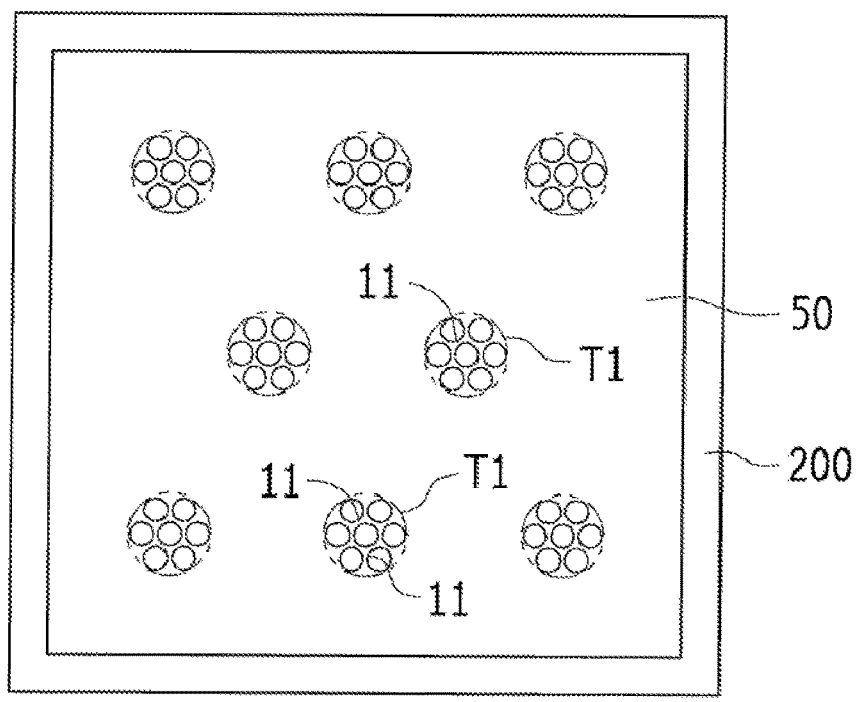
FIG. 8 is a plan view schematically showing a state in which through-holes are formed in all mesh formation regions of the first film material.
Figure 9:
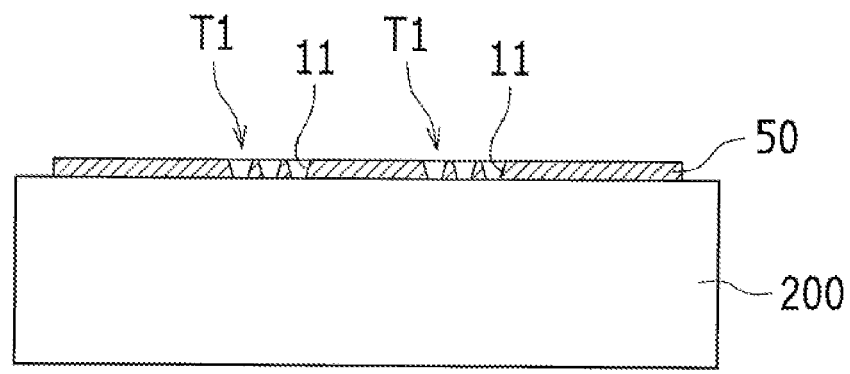
FIG. 9 is a cross-sectional view schematically showing a state in which through-holes are formed in all mesh formation regions of the first film material.

As shown in FIGS. 8 and 9, if the processing has been completed for all mesh formation regions T1 (step S5: Yes), the procedure advances to step S7, where the formed through-holes 11 are inspected.

In the inspection of a through-hole 11, first, the opening diameter R1 of the inlet opening is measured using image processing. The measurement of the opening diameter R1 may be performed on all through-holes 11, or may be performed on some of the through-holes 11.

Subsequently, the first film material 50 is detached from the chuck table 200, the first film material 50 is turned over and fixed to the chuck table 200. Then, the opening diameter R2 of the outlet opening is measured using image processing. The measurement of the opening diameter R2 may be performed on all through-holes 11, or may be performed on some of the through-holes 11.

In this manner, the processing on the first film material 50 is performed.

Processing Procedure on Second Film Material

Figure 10:
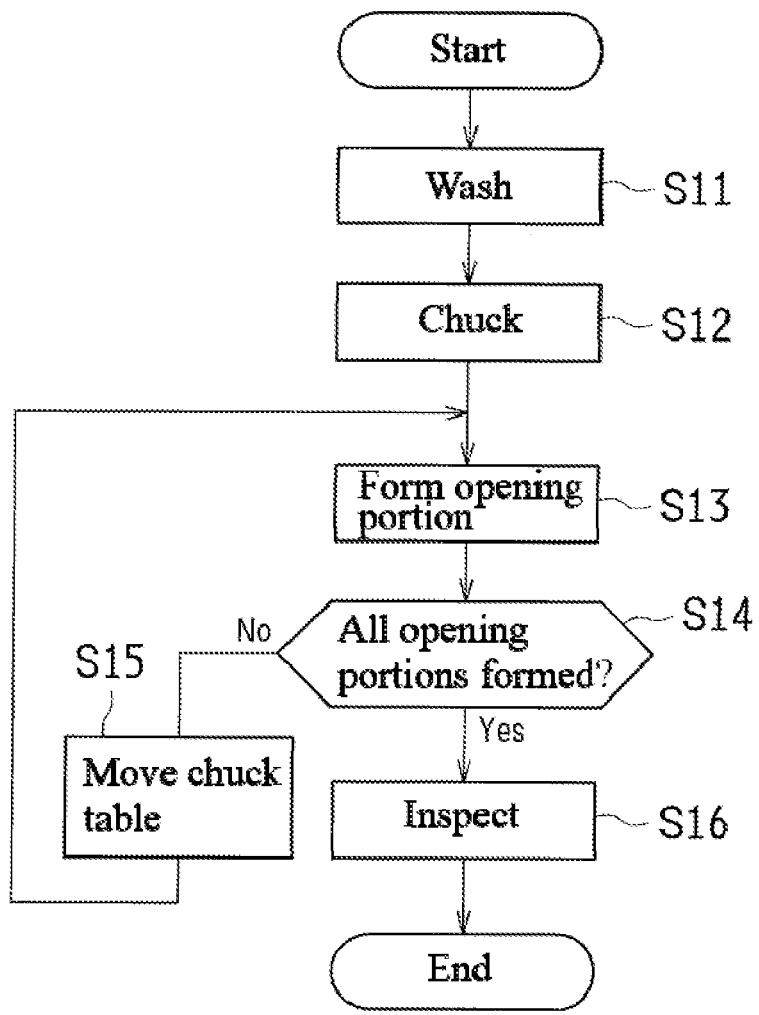
FIG. 10 is a flowchart illustrating the processing procedure on a second film material, in the method for producing a mesh of this embodiment.

First, in step S11 of FIG. 10, the second film material 60 is washed. The second film material 60 is, for example, made of black polycarbonate, and has a having a thickness of 410 µm. There is no particular limitation on the size of the second film material 60, but it is, for example, the same as the size (A5 or A6) of the first film material 50. In this washing step, the second film material 60 is subjected to ultrasonic washing with IPA or the like for approximately several tens of seconds to several minutes. Subsequently, IPA is blown off the second film material 60 using an air gun or the like.

Figure 11:
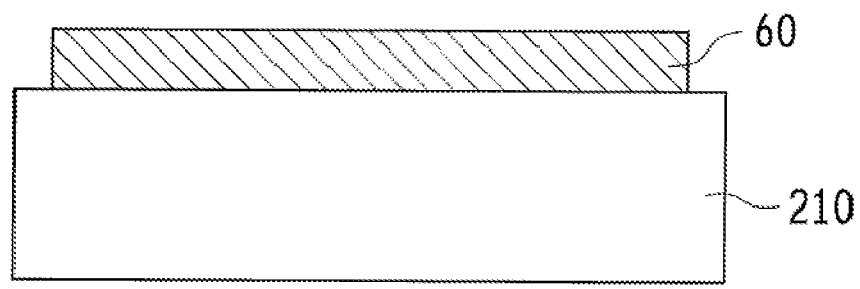
FIG. 11 is a cross-sectional view schematically showing a state in which the second film material is chucked.

Next, in step S12, the second film material 60 is placed on a chuck table 210 as shown in FIG. 11. Then, the second film material 60 is fixed to the chuck table 210 using a vacuum chuck. It is preferable that a porous ceramic chuck is used as the chuck table 210, so that the entire face of the second film material 60 is chucked. Note that the chuck table 210 is provided on an XY stage.

Figure 12:
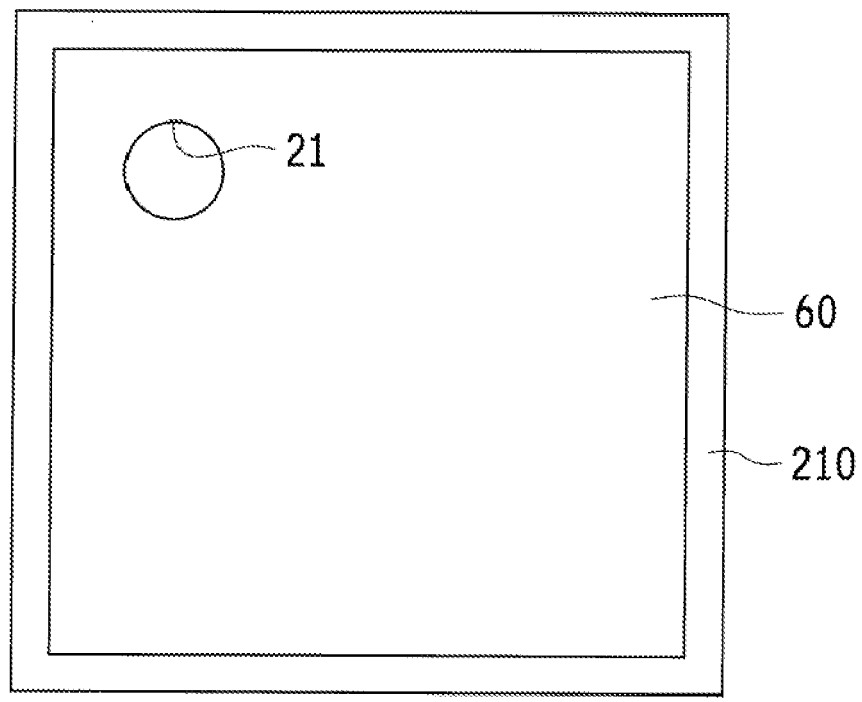
FIG. 12 is a plan view schematically showing a state in which one opening portion is formed in the second film material.

Next, in step S13, an opening portion 21 is formed at a position that conforms to the mesh formation region T1 as shown in FIG. 12. The opening portion 21 has an opening diameter of, for example, 2.7 mm, and is formed by a punch, a laser marker, or the like.

Subsequently, when one opening portion 21 is formed, it is determined in step S14 whether or not all opening portions 21 have been formed. Note that all opening portions 21 make up a preset number of opening portions. The preset number is, for example, the same number as the number of mesh formation regions T1 of the first film material 50, that is, 320. If all opening portions 21 are not formed, the procedure advances to step S15.

In step S15, the second film material 60 is moved with the XY stage in a horizontal direction, for example, by approximately 7 mm, after which the procedure returns to step S13. Accordingly, a plurality of opening portions 21 are formed in the second film material 60 so as to respectively conform to the plurality of mesh formation regions T1 of the first film material 50. The XY stage for transporting the second film material 60 preferably has a driving performance similar to that of the XY stage for transporting the first film material 50. The reason for this is that positional deviation between the opening portion 21 and the through-holes 11 when the first film material 50 and the second film material 60 are layered is suppressed.

Figure 13:
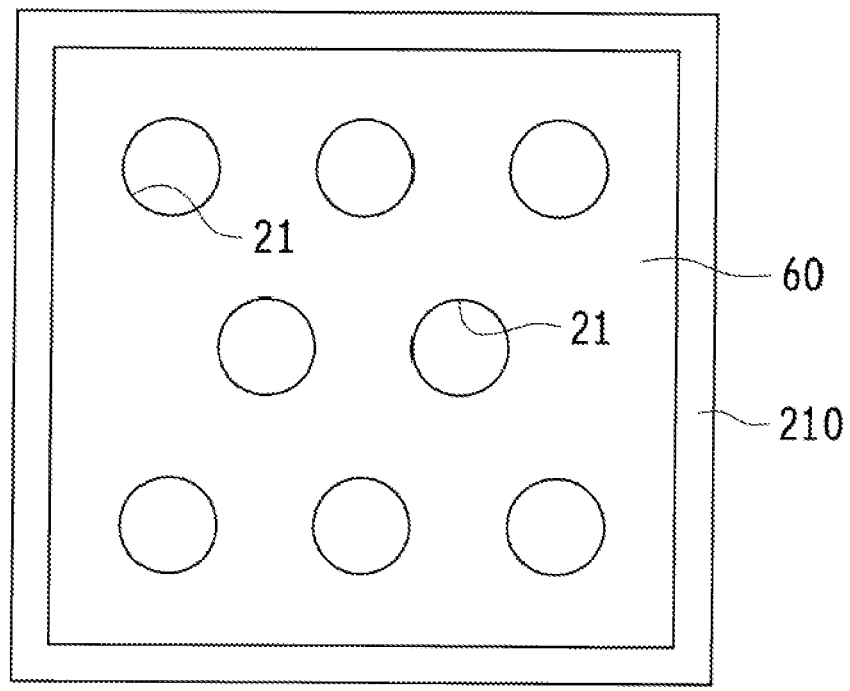
FIG. 13 is a plan view schematically showing a state in which all opening portions are formed in the second film material.
Figure 14:
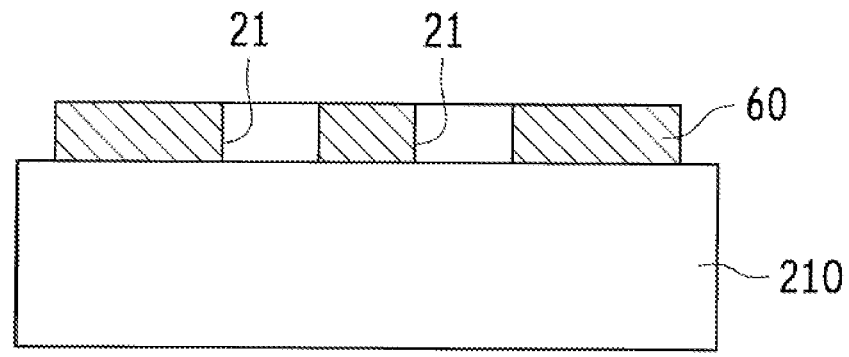
FIG. 14 is a cross-sectional view schematically showing a state in which all opening portions are formed in the second film material.

Then, if all opening portions 21 are formed as shown in FIGS. 13 and 14 (step S14: Yes), the procedure advances to step S16, where the formed opening portions 21 are inspected.

In the inspection of an opening portion 21, for example, the opening diameter is measured using image processing. Note that the measurement of the opening diameter may be performed on all opening portions 21, or may be performed on some of the opening portions 21. If the opening portions 21 are formed by a punch, the opening portions 21 may be inspected by checking the position of the punch (e.g., whether or not the punch has reached the bottom dead center).

In this manner, the processing on the second film material 60 is performed.

Processing Procedure on First Film Material and Second Film Material

Figure 15:
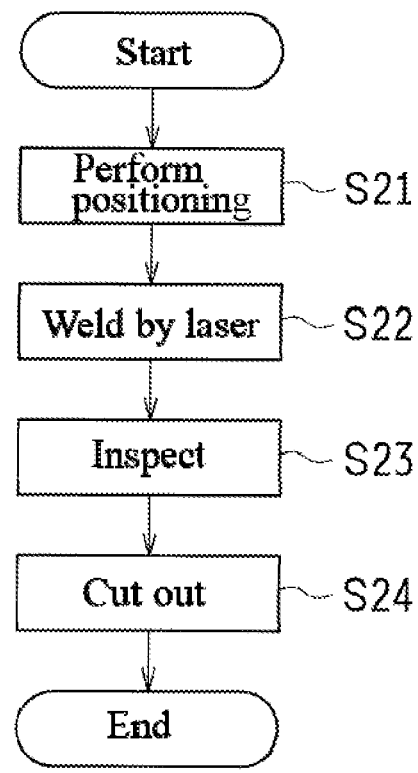
FIG. 15 is a flowchart illustrating the processing procedure on both a first film material and a second film material, in the method for producing a mesh of this embodiment.
Figure 16:
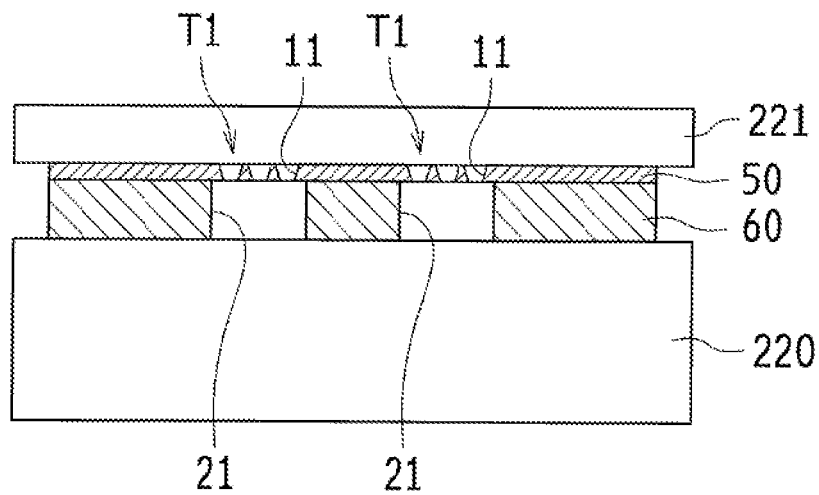
FIG. 16 is a cross-sectional view schematically showing a state in which the first film material and the second film material are positioned.
Figure 17:
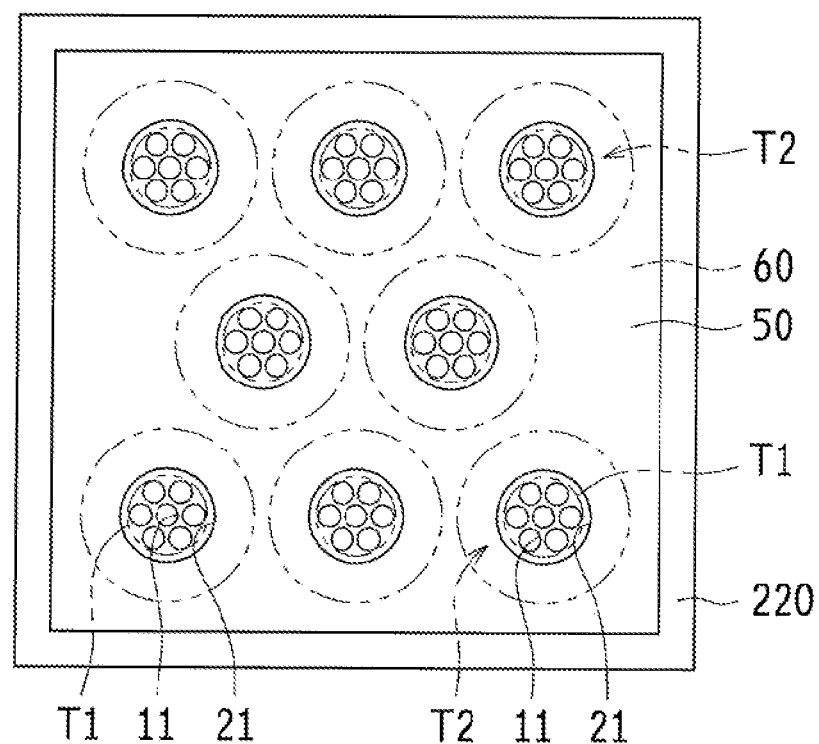
FIG. 17 is a plan view schematically showing a state in which the first film material and the second film material are positioned.

First, in step S21 of FIG. 15, the first film material 50 and the second film material 60 are positioned. Specifically, as shown in FIGS. 16 and 17, the second film material 60 subjected to the above-described processing is placed on a mounting table 220. Then, the first film material 50 subjected to the above-described processing is placed on the second film material 60. At this time, the first film material 50 is positioned with respect to the second film material 60 such that the inlet openings of the through-holes 11 are on the upper side. The positioning is performed, for example, by forming positioning holes (not shown) at predetermined positions (e.g., for corners) of each of the first film material 50 and the second film material 60 and inserting pins through the positioning holes.

Subsequently, the first film material 50 and the second film material 60 are pressurized using a plate-like member 221 (see FIG. 16). The plate-like member 221 is configured to allow transmission of a laser beam for joining therethrough. In consideration of making the figure easier to understand, the plate-like member 221 is not shown in FIG. 17.

In step S22, the first film material 50 and the second film material 60 are joined to each other through laser welding. The laser beam for joining is emitted from the plate-like member 221 side toward the second film material 60, transmitted through the plate-like member 221 and the first film material 50, and absorbed by the second film material 60. Specifically, a ring-like region T2 (see FIG. 17) surrounding each opening portion 21 is joined by welding. In this embodiment, the first film material 50 and the second film material 60 are welded to each other by a continuous-wave semiconductor laser at a wavelength of 808 nm.

Then, in step S23, the joined portions are inspected using image processing or the like. Subsequently, in step S24, the outer circumference of each joined portion (e.g., portion located slightly inward from the outer circumference of the ring-like region T2) is cut out by a punch or the like. Accordingly, the mesh 100 as shown in FIGS. 1 and 2 is obtained. That is to say, in this embodiment, 320 meshes 100 are formed from one first film material 50 and one second film material 60.

Effects

In this embodiment, as described above, the through-holes 11 of the mesh formation region T1 are formed using an ultraviolet laser beam, and thus the design of the through-holes 11 of the mesh formation region T1 can be easily changed by changing the ultraviolet light laser irradiation conditions or the like. Accordingly, the mesh 100 having different opening diameters, numbers, or the like of the through-holes 11 can be produced at a cost lower than that in the case where a mold or the like is used. Thus, the mesh 100 that corresponds to a medical fluid can be easily provided. Furthermore, since the first film material 50 and the second film material 60 are joined to each other through laser welding, the heat-affected zone can be narrowed, and thus unevenness in the spray performance of the mesh 100 can be suppressed.

Furthermore, in this embodiment, a large number of through-holes 11 are formed all at once in a plurality of mesh formation regions T1 of the first film material 50, and a plurality of opening portions 21 are formed all at once in the second film material 60, after which the first film material 50 and the second film material 60 are joined to each other through laser welding, and a plurality of meshes 100 are cut out, and thus the productivity can be improved.

Furthermore, in this embodiment, the first film material 50 and the second film material 60 are welded to each other after the through-holes 11 are formed, and thus the through-holes 11 can be formed before the first film material 50 is thermally affected as a result of welding, so that unevenness in the shape of the through-holes 11 can be suppressed.

Furthermore, in this embodiment, the ultraviolet light laser irradiation conditions are modified according to the thickness of the mesh formation region T1, and thus unevenness in the shape (outlet opening diameter) of the through-holes 11 is suppressed.

Furthermore, in this embodiment, the through-holes 11 each having the cylindrical portion 112 are formed such that the diameter decreases in two steps, and thus it is possible to suppress an increase in the spray diameter, while increasing the spray amount from the mesh 100. This aspect will be described later in detail.

Furthermore, in this embodiment, since the thermal effect on the first film material 50 can be suppressed as a result of the second film material 60 absorbing the laser beam for joining, deformation or shrinkage of the mesh formation region T1 can be suppressed.

Furthermore, in this embodiment, the heat-affected zone can be narrowed by applying pressure with the plate-like member 221 during laser welding, and thus, when processing a plurality of opening portions 21 in parallel, positional deviation of the opening portions 21 due to shrinkage or the like during welding of the ring-like regions T2 surrounding the opening portions 21 can be suppressed. Accordingly, the processing can be performed in parallel, and thus the productivity is increased, and unevenness in the spray performance can be suppressed.

Shape of Through-Holes

Figure 18:
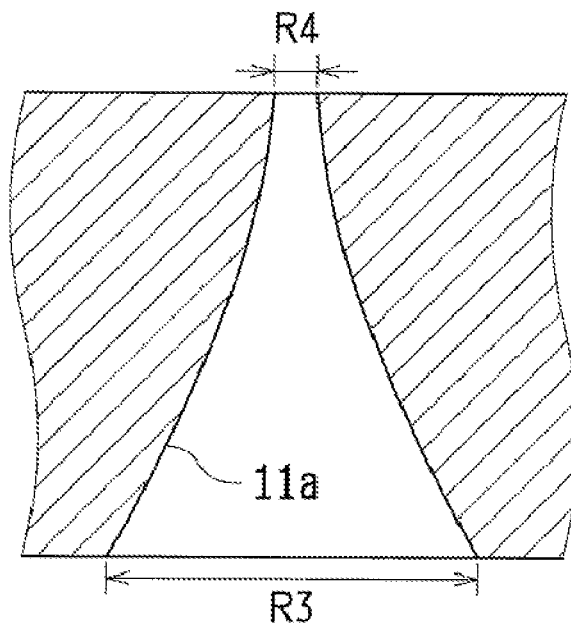
FIG. 18 is an enlarged cross-sectional view showing a through-hole according to a first modified example of this embodiment.

Although this embodiment described the through-holes 11 each having the cylindrical portion 112 formed such that the diameter decreases in two steps (see FIG. 3), there is no limitation to this, and such a cylindrical portion may not be formed as in a through-hole 11*a* according to a first modified example shown in FIG. 18. The through-hole 11*a* is formed such that an opening diameter R3 on one of the end sides thereof is larger than an opening diameter R4 on the other end side, and is configured such that the diameter gradually decreases from the one end side toward the other end side. That is to say, the through-hole 11*a* is formed such that the diameter continuously decreases along the entire length in the thickness direction. The through-hole 11*a* can be formed, for example, by performing processing in the first step at a power of 80 mW in a defocused state by 0.3 mm and performing processing in the second step at a power of 80 mW in a just focused state using a lens having a low numerical aperture NA (e.g., 0.025).

Figure 19:
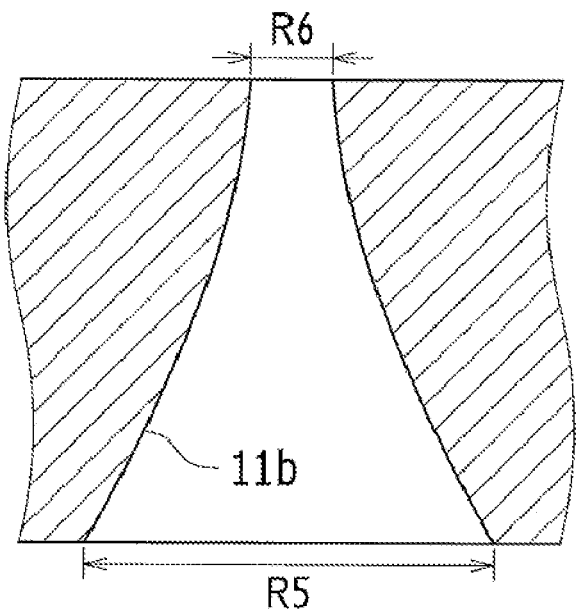
FIG. 19 is an enlarged cross-sectional view showing a through-hole according to a second modified example of this embodiment.

In the case where the diameter continuously decreases, an opening diameter R6 on the other end side becomes larger in accordance with an increase in an opening diameter R5 on the one end side as in a through-hole 11*b* according to a second modified example shown in FIG. 19. The through-hole 11*b* is configured such that the diameter gradually decreases from the one end side toward the other end side, and the opening diameter is, as a whole, larger than that of the through-hole 11*a*.

An evaluation test was performed on the spray performance of the meshes having the through-holes 11 to 11*b*. Table 1 shows the results. In the through-holes 11 each having the cylindrical portion 112 formed such that the diameter decreased in two steps (see FIG. 3), the opening diameter R1 of the inlet opening was about 25 μm, and the opening diameter R2 of the outlet opening was about 3.3 μm. In the through-holes 11*a* each formed such that the diameter continuously decreased (see FIG. 18), the opening diameter R3 of the inlet opening was about 25 μm, and the opening diameter R4 of the outlet opening was about 3.3 μm. In the through-holes 11*b* each formed such that the diameter continuously decreased (see FIG. 19), the opening diameter R5 of the inlet opening was about 28 μm, and the opening diameter R6 of the outlet opening was about 4.9 μm.

TABLE 1

| | Mesh having through-holes 11a | | Mesh having through-holes 11b | | Mesh having through-holes 11 | |
|---|---|---|---|---|---|---|
| | Spray amount (g) | Spray diameter (μm) | Spray amount (g) | Spray diameter (μm) | Spray amount (g) | Spray diameter (μm) |
| Pulmicort | 0.15 | 5.0 | 0.25 | 10.0 | 0.34 | 7.6 |
| Alevaire | 0.13 | 3.9 | 0.53 | 8.8 | 0.61 | 7.6 |
| Mucofilin | 0.06 | — | 0.31 | 8.1 | 0.46 | 6.4 |
| Purified water | 0.46 | 6.2 | 1.10 | 9.4 | 1.16 | 9.1 |

In this test, Pulmicort (registered trademark), Alevaire (registered trademark), Mucofilin (registered trademark), and purified water were sprayed individually using the mesh having the through-holes 11, and the spray amount and the spray diameter at that time were measured. The mesh having the through-holes 11a the mesh having the through-holes 11b were evaluated in a similar manner. Note that, when Mucofilin was sprayed using the mesh having the through-holes 11a, the spray amount was so small that the spray diameter was not measured.

It is seen from the test results shown in Table 1 that the mesh having the through-holes 11b had a larger spray amount and a larger spray diameter than those of the mesh having the through-holes 11a. The reason for this seems to be that the opening diameter R6 of the outlet opening of the through-holes 11b was larger than the opening diameter R4 of the outlet opening of the through-holes 11a. That is to say, in the case where the diameter continuously decreases, an increase in the spray amount leads to an increase in the spray diameter.

In the case of the mesh having the through-holes 11, the spray amount was larger than that of the mesh having the through-holes 11a, and the spray diameter was smaller than that of the mesh having the through-holes 11b. Accordingly, it is seen that the mesh having the through-holes 11 each formed such that the diameter decreases in two steps has a preferable spray performance because it is possible to suppress an increase in the spray diameter, while increasing the spray amount.

The mesh having the through-holes 11 and the mesh having the through-holes 11b had similar spray diameters in the case of purified water, but significantly different spray diameters in the case of medical fluids (Pulmicort, Alevaire, and Mucofilin). That is to say, it will be appreciated that the mesh having the through-holes 11 has a good spray performance especially when spraying medical fluids. Note that such a difference between purified water and medical fluids seems to be derived from a difference in the viscosity or surface tension.

Shape of Reinforcing Member

Next, a relationship between the shape of the reinforcing member and the spray amount will be described. Below, a relationship between the thickness of the reinforcing member and the spray amount will be described, after which a relationship between the opening diameter of each opening portion of the reinforcing member and the spray amount will be described.

Regarding Thickness

Figure 20:
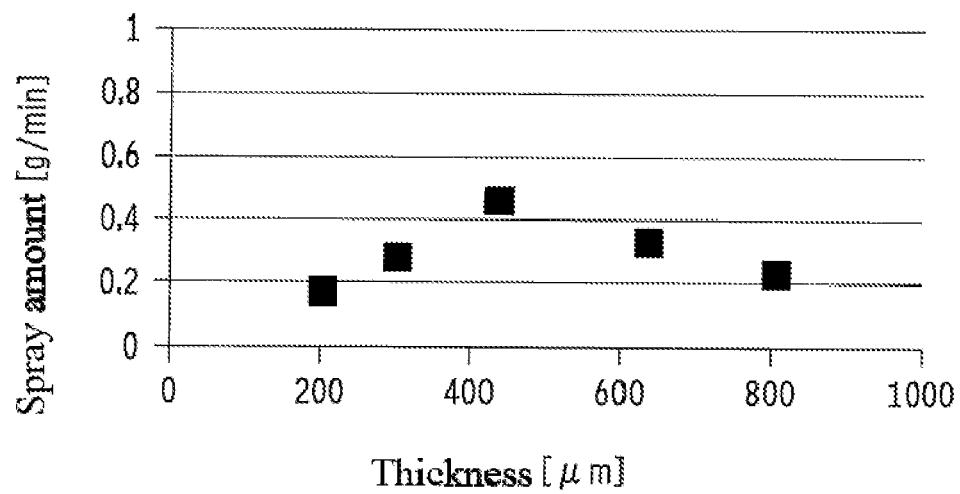
FIG. 20 is a graph showing a relationship between the thickness of the reinforcing member and the spray amount.

First, a plurality of mesh main bodies each having 2800 through-holes in a zigzag pattern at a spacing of 30 μm were produced. The through-holes each had an opening diameter of the inlet opening of 25 μm and an opening diameter of the outlet opening of 3.5 μm. Furthermore, a plurality of reinforcing members having different thicknesses were produced. The reinforcing members had the same opening diameter of the opening portions of 2.3 mm. The mesh main bodies and the reinforcing members were joined, so that a plurality of meshes with reinforcing members having different thicknesses were produced. The spray amounts of the meshes were measured. FIG. 20 shows the results.

It is seen from FIG. 20 that, if the thickness of the reinforcing member is as large as approximately 800 μm or is as small as approximately 200 μm, the spray amount decreases. Note that the meshes had the same total opening area of the through-holes. Accordingly, the thickness of the reinforcing member is preferably 300 μm to 600 μm.

Regarding Opening Diameter of Opening Portion

Figure 21:
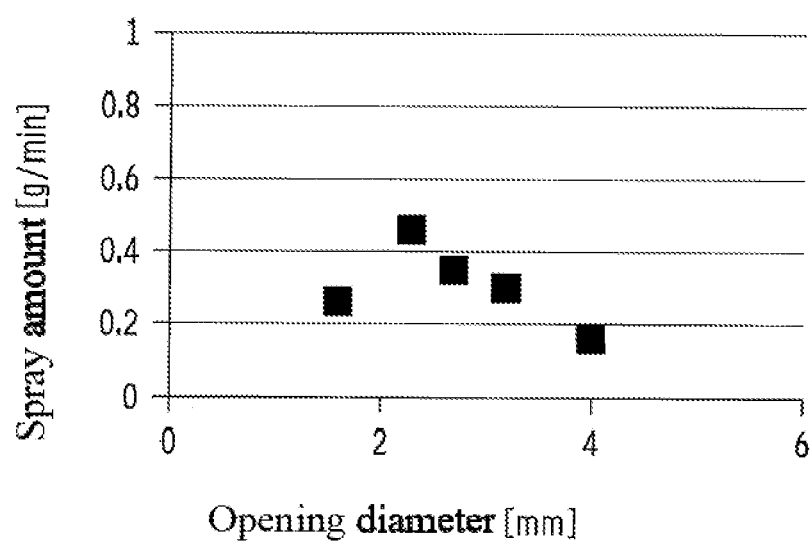
FIG. 21 is a graph showing a relationship between the opening diameter of each opening portion of the reinforcing member and the spray amount.

First, a plurality of mesh main bodies similar to those described above were produced. Furthermore, a plurality of reinforcing members having different opening diameters were produced. The reinforcing members had the same thickness of 440 μm. The mesh main bodies and the reinforcing members were joined, so that a plurality of meshes having different opening diameters were produced. The spray amounts of the meshes were measured. FIG. 21 shows the results.

It is seen from FIG. 21 that, if the opening diameter is as large as approximately 4 mm or is as small as approximately 1.6 mm, the spray amount decreases. Note that the meshes had the same total opening area of the through-holes. Accordingly, the opening diameter of the reinforcing member is preferably 2.3 mm to 3.2 mm.

Other Embodiments

The embodiment disclosed in this application is to be construed in all respects as illustrative and not limiting. The technical scope of the present invention is indicated by the appended claims rather than only by the foregoing description. All variations falling within the meaning and range of equivalency of the claims are intended to be embraced therein.

For example, although this embodiment described an example in which the mesh main body 10 and the reinforcing member 20 are joined to each other through laser welding, there is no limitation to this, and the mesh main body and the reinforcing member may be joined to each other by other methods. Furthermore, the reinforcing member may not be provided.

Figure 22:
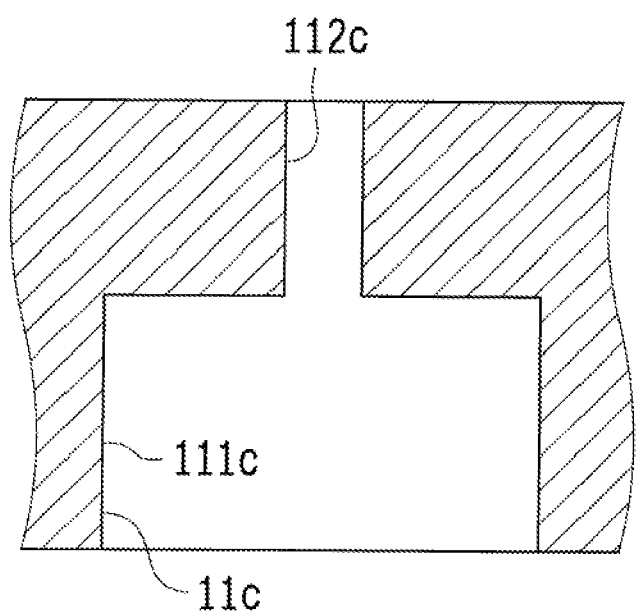
FIG. 22 is an enlarged cross-sectional view showing a through-hole according to a third modified example of this embodiment.

Furthermore, although this embodiment described an example in which the through-holes 11 each have the cylindrical portion 112 and the diameter-decreasing portion 113, there is no limitation to this, and a plurality of cylindrical portions 111c and 112c having different opening diameters may be formed as in a through-hole 11c according to a third modified example shown in FIG. 22. The through-hole 11c is formed such that the opening diameter on one of the end sides (inlet opening) thereof is larger than the opening diameter on the other end side (outlet opening). Furthermore, the through-hole 11c has the cylindrical portion 111c on the one end side and the cylindrical portion 112c on the other end side, and the cylindrical portions 111c and 112c are formed to be continuous via a step portion. The opening diameter of the cylindrical portion 111c is larger than the opening diameter of the cylindrical portion 112c, and each of the cylindrical portions 111c and 112c has an opening diameter that is substantially the same throughout the thickness direction. Although an example is shown in which the through-hole 11c has two cylindrical portions 111c and 112c having different opening diameters, there is no limitation to this, and the through-hole may have three or more cylindrical portions having different opening diameters.

Furthermore, although this embodiment described an example in which the mesh main body 10 has a thickness of 30 μm, there is no limitation to this, and the mesh main body may have a thickness other than 30 μm. Note that the mesh main body may have a thickness of preferably 100 μm or less, and more preferably 50 μm or less.

Furthermore, although this embodiment described an example in which the mesh main body 10 is made of polycarbonate, there is no limitation to this, and the mesh main body may be made of other materials as long as the obtained mesh main body allows through-holes to be formed therethrough and can be used for a nebulizer. Examples of the material of the mesh main body include polysulfone, polyphenylsulfone, polyetherimide, polyether ether ketone, polyphenylenesulfide, polyvinylidene fluoride, polyphenylene ether, polyacetal, polypropylene, polyethylene terephthalate, and the like.

Furthermore, although this embodiment described an example in which the reinforcing member 20 has a thickness of 410 μm, there is no limitation to this, and the reinforcing member may have a thickness other than 410 μm. Note that the reinforcing member may have a thickness of preferably 100 μm or more, and more preferably 300 μm or more.

Furthermore, although this embodiment described an example in which the reinforcing member 20 is made of polycarbonate, there is no limitation to this, and the reinforcing member may be made of another material as long as the obtained reinforcing member can be joined to the mesh main body and can be used for a nebulizer. Examples of the material of the reinforcing member include polysulfone, polyphenylsulfone, polyetherimide, polyether ether ketone, polyphenylenesulfide, polyvinylidene fluoride, polyphenylene ether, polyacetal, polypropylene, polyethylene terephthalate, and the like.

Furthermore, although this embodiment described an example in which the through-holes 11 are formed through defocusing, there is no limitation to this, and through-holes having desired shapes may be formed by performing helical processing at a just focus position. In a similar manner, through-holes having desired shapes may be formed by changing the mask size in the mask transfer method. In a similar manner, through-holes having desired shapes may be formed by continuously changing the mask size and changing the laser beam diameter so as to change the numerical aperture NA, thereby controlling the diameter-decreasing angle of the through-holes.

Furthermore, although this embodiment described an example in which one through-hole 11 is formed by performing ultraviolet laser irradiation in two steps, there is no limitation to this, and a through-hole may be formed by performing laser irradiation in three steps or more.

Furthermore, although this embodiment described an example in which a YAG fourth harmonic was used as the ultraviolet laser beam, there is no limitation to this, and a YAG third harmonic or an excimer laser may be used as the ultraviolet laser beam. Note that the ultraviolet laser beam preferably has a wavelength of 350 nm or less.

Furthermore, although this embodiment described an example in which the beam is converged using a telecentric fθ lens, there is no limitation to this, and the beam may be converged using other lenses such as an fθ lens or a spherical lens.

Furthermore, although this embodiment described an example in which a single laser beam is scanned, there is no limitation to this, and a laser beam may be branched using a diffractive optical element or the like and a plurality of laser beams may be scanned all at once. With this configuration, the productivity can be improved.

Furthermore, although this embodiment described an example in which a large number of through-holes 11 are formed in one mesh formation region T1 by performing scanning using a galvano mirror, there is no limitation to this, and a large number of through-holes may be formed in each of a plurality of mesh formation regions by performing scanning using a galvano mirror. With this configuration, the number of times that the XY stage is moved can be reduced, and thus the processing time can be shortened.

Furthermore, although this embodiment described an example in which various types of inspections are performed, there is no limitation to this, and inspections may not be performed, or only some of the inspections may be performed.

Furthermore, in this embodiment, the diameter of the mesh 100, the number, spacing, and arrangement of the through-holes 11, and the like are merely an example, and may be changed as appropriate.

Furthermore, although this embodiment described an example in which a semiconductor laser is used as a laser for joining the first film material 50 and the second film material 60, there is no limitation to this, and the first film material and the second film material may be joined to each other by other lasers.

Furthermore, although this embodiment described an example in which the ring-like region T2 surrounding each opening portion 21 is joined by welding as the laser welding region at which the first film material 50 and the second film material 60 are joined to each other, a single or a plurality of linear or dotted welding positions may be formed before the ring-like region T2 is welded. With this configuration, temporary joining can be performed at the linear or dotted welding positions, and thus the shrinkage in the laser welding of the ring-like region T2 can be further suppressed. Accordingly, the level of precision of the positions of the through-holes 11 with respect to the opening portions 21 can be improved.

Furthermore, although this embodiment described an example in which the first film material 50 in which the through-holes 11 are formed and the second film material 60 in which the opening portions 21 are formed are layered, there is no limitation to this, and the through-holes may be formed through the first film material in a state where the second film material in which the opening portions are formed and the first film material are layered. With this configuration, the level of precision of the positions of the through-holes with respect to the opening portions can be improved.

Furthermore, although this embodiment described an example in which the first film material 50 allows transmission of a laser beam for joining therethrough and the second film material 60 absorbs the laser beam for joining, there is no limitation to this, and the second film material may allow transmission of a laser beam for joining therethrough and the first film material may absorb the laser beam for joining.

Furthermore, in this embodiment, a step of, after cutting out and forming a plurality of meshes 100, washing the meshes 100 may be provided. Furthermore, a step of evaluating the spray performance of the mesh 100 may be provided.

INDUSTRIAL APPLICABILITY

The present invention is applicable to a method for producing a mesh in which a plurality of through-holes are formed, and a mesh.

INDEX TO THE REFERENCE NUMERALS

10 Mesh main body
11 Through-hole
11a Through-hole
11b Through-hole
11c Through-hole
20 Reinforcing member
21 Opening portion
50 First film material
60 Second film material 100 Mesh
111c Cylindrical portion
112 Cylindrical portion
112c Cylindrical portion
113 Diameter-decreasing portion
T1 Mesh formation region

The invention claimed is:

1. A mesh comprising:
a resin mesh main body; and
a resin reinforcing member configured to reinforce the mesh main body,
wherein a mesh formation region is provided in the mesh main body, and a plurality of through-holes are formed in the mesh formation region,
the reinforcing member is formed in a shape of a ring so as to surround the mesh formation region, and
the mesh main body and the reinforcing member are joined to each other,
each of the plurality of through-holes is formed such that an opening diameter on one end side thereof is larger than an opening diameter on another end side, and has a plurality of cylindrical portions having different diameters with a step portion between adjacent two of the plurality of cylindrical portions.

2. A mesh comprising:
a first resin film including a mesh formation region in which a plurality of laser through-holes are provided; and
a second resin film provided on the first resin film and including an opening whose edge surrounds the mesh formation region to reinforce the mesh formation region of the first resin film, wherein
each of the first resin film and the second resin film includes, at an area surrounding the opening, a laser weld portion that joins the first and second resin films to each other, and
each of the plurality of laser through-holes is formed such that an opening diameter on one end side thereof is larger than an opening diameter on another end side, and has a plurality of cylindrical portions having different diameters with a step portion between adjacent two of the plurality of cylindrical portions.

* * * * *